(12) United States Patent  
Wattai et al.

(10) Patent No.: US 8,136,509 B2
(45) Date of Patent: Mar. 20, 2012

(54) RESERVOIR-LESS FUEL DELIVERY MODULE HAVING CLIP CONNECTION TO A FLANGE

(75) Inventors: John Patrick Wattai, Rochester Hills, MI (US); Brandon John Goll, Orion, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 377 days.

(21) Appl. No.: 12/219,669

(22) Filed: Jul. 25, 2008

(65) Prior Publication Data

US 2009/0025691 A1 Jan. 29, 2009

Related U.S. Application Data

(60) Provisional application No. 60/962,219, filed on Jul. 27, 2007.

(51) Int. Cl.
*F02M 37/04* (2006.01)

(52) U.S. Cl. ...................................................... 123/509

(58) Field of Classification Search .................. 123/509, 123/198 C, 495, 497, 198 E; 417/363, 423.15, 417/424.2, 448

See application file for complete search history.

(56) References Cited

U.S. PATENT DOCUMENTS

| 6,267,103 | B1 * | 7/2001 | Ludwig et al. ................ 123/509 |
| 2004/0020289 | A1 * | 2/2004 | Gouzou et al. .................. 73/313 |
| 2004/0173187 | A1 * | 9/2004 | Kanamaru et al. ............ 123/509 |
| 2006/0130815 | A1 * | 6/2006 | Gaffield et al. ................ 123/509 |

FOREIGN PATENT DOCUMENTS

| DE | 19837954 C1 | 1/2000 |
| EP | 0403363 A | 12/1990 |
| EP | 1455082 A | 9/2004 |
| WO | WO 02/25094 A | 3/2002 |

\* cited by examiner

*Primary Examiner* — Stephen K Cronin
*Assistant Examiner* — Sizo Vilakazi

(57) ABSTRACT

A reservoir-less fuel delivery module (10) for a fuel tank of a vehicle includes a flange (26) constructed and arranged to be mounted to an opening in a fuel tank of a vehicle. The module includes a pump and filter structure (20) having a fuel pump (14) and a fuel filter (24) surrounding at least a portion of the fuel pump for filtering fuel exiting the fuel pump. The module includes a mounting member (30) to which the pump and filter structure is mounted. Clip structure (34) couples the mounting member to the flange so that the pump is decoupled from the flange.

20 Claims, 2 Drawing Sheets

RESERVOIR-LESS FUEL DELIVERY MODULE HAVING CLIP CONNECTION TO A FLANGE

This application claims the benefit of the earlier filing date of U.S. Provisional Application No. 60/962,219, filed on Jul. 27, 2007, which is hereby incorporated by reference into this specification.

FIELD OF THE INVENTION

The invention relates to fuel delivery modules for vehicles and, more particularly, to a reservoir-less type fuel module wherein a fuel pump is decoupled from a mounting flange of the module.

BACKGROUND OF THE INVENTION

Fuel delivery modules of vehicles can include a fuel pump mounted in a reservoir within a fuel tank. The reservoir is kept supplied with fuel from the tank so that the pump can supply fuel to an engine under certain conditions such as, when the vehicle is on an incline and fuel would otherwise not be supplied to the pump.

There is also a reservoir-less type fuel delivery module that typically includes a steel flange constructed and arranged to be mounted to a fuel tank, a pump and filter structure having a filter surrounding a fuel pump, and a regulator associated with the fuel pump. A portion of the pump and filter structure is welded directly to the flange that is mounted to the fuel tank. Since the pump and filter structure is welded directly to the flange, noise of the pump may be transmitted to the flange causing the module to be quite noisy.

Thus, there is a need provide improved fuel delivery module for a reservoir-less type system that reduces the overall noise of the module.

SUMMARY OF THE INVENTION

An object of the invention is to fulfill the need referred to above. In accordance with the principles of the disclosed embodiments, this objective is obtained by a fuel delivery module for a fuel tank of a vehicle. The fuel delivery module includes a flange constructed and arranged to be mounted to an opening in a fuel tank of a vehicle. The module includes a pump and filter structure having a fuel pump and a fuel filter surrounding at least a portion of the fuel pump for filtering fuel exiting the fuel pump. The module includes a mounting member to which the pump and filter structure is mounted. Clip structure couples the mounting member to the flange so that the pump is decoupled from the flange.

In accordance with another aspect of the embodiments, a fuel delivery module for a fuel tank of a vehicle includes a flange constructed and arranged to be mounted to an opening in a fuel tank of a vehicle. The module includes pump and filter structure having a fuel pump and a fuel filter surrounding at least a portion of the fuel pump for filtering fuel exiting the fuel pump. The module includes a mounting member to which the pump and filter structure is mounted. Means for coupling the mounting member to the flange is provided so that the pump is decoupled from the flange.

In accordance with yet another aspect of the embodiments, a method of decoupling a fuel pump from a flange of a fuel delivery module provides a flange constructed and arranged to be mounted to an opening in a fuel tank of a vehicle. A pump and filter structure is provided and includes a fuel pump and a fuel filter surrounding at least a portion of the fuel pump for filtering fuel exiting the fuel pump. The pump and filter structure is mounted to a mounting member. The mounting member is mounting to the flange via a clip structure so that the pump is decoupled from the flange.

Other objects, features and characteristics of the present embodiments, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
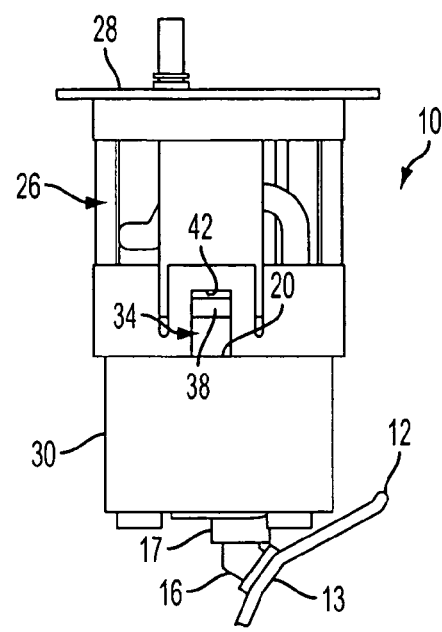
FIG. 1 is a side view of a fuel delivery module in accordance with an embodiment of the invention showing clip structure coupling a flange to a mounting member.
Figure 2:
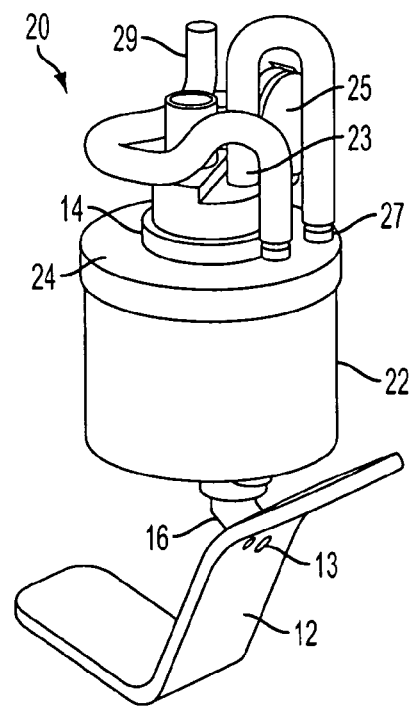
FIG. 2 is view of a pump and filter structure of the module of FIG. 1, shown coupled to a support member.

With reference to FIG. 1, a reservoir-less fuel delivery module for a vehicle is shown, generally indicated at 10, in accordance with an embodiment of the present invention. The module 10 includes a tank bottom referencing pump filter 12 constructed and arranged to filter fuel prior to entering a fuel pump 14 (FIG. 2). The pump filter 12 is generally L-shaped having an opening 13 therein. An outlet 16 of the pump filter 12 communicates with an inlet 17 of the pump 14. The outlet 16 communicates with the opening 13 such that fuel may be drawn from the fuel tank, be pre-filtered by pump filter 12, and sent to the inlet 17 of the pump 14.

With reference to FIG. 2, the module 10 includes a pump and filter structure, generally indicated at 20. The structure 20 includes a housing 22 containing a filter 24 (FIG. 2) that substantially surrounds the cylindrical fuel pump 14 to filter fuel prior to being delivered to an engine (not shown) of the vehicle. A fuel regulator 25 ensures excess fuel is returned to the tank in the conventional manner. The fuel pump 14 can be considered to be part of the pump and filter structure 20. An outlet 23 of the pump 14 is constructed and arranged to direct fuel to a dirty side of the filter 24 at an inlet 27 of the filter 24. Filtered fuel exits the clean side of the filter 24 and is delivered through a tube 29 that is connected to a flange 26 (FIG. 1).

Figure 3:
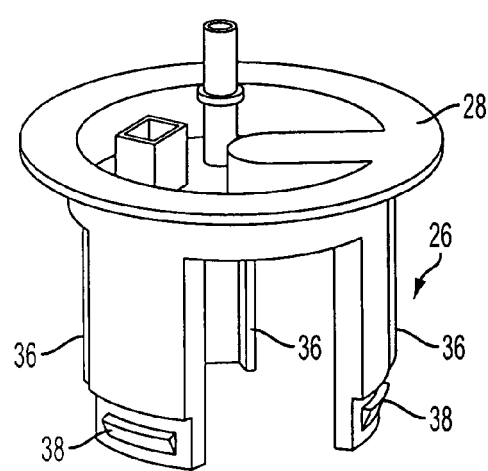
FIG. 3 is a view of the flange of the module of FIG. 1.

With reference to FIGS. 1 and 3, the flange, generally indicated at 26, preferably of plastic, includes a lip 28 that is constructed and arranged to mount to surfaces defining an opening in a fuel tank (not shown). The flange 26 permits conventional hoses and electrical connections to pass from inside the fuel tank to outside thereof.

Figure 4:
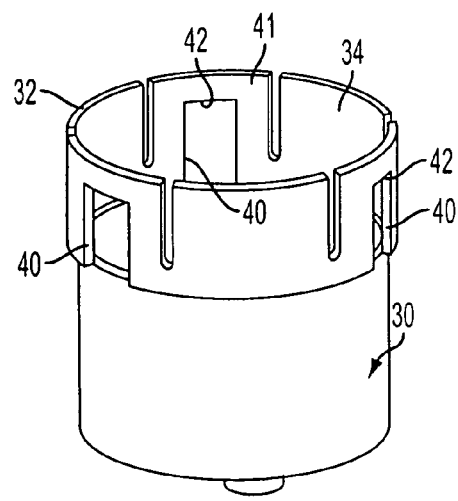
FIG. 4 is a view of the mounting member of the module of FIG. 1.

In accordance with an embodiment, in order to couple the pump and filter structure 20 to the flange 26, a mounting member, generally indicated at 30, is provided. As shown in FIG. 4, the mounting member 30 is generally cylindrical having an opened end 32 and an interior 34. The pump and filter structure 20 is inserted through the opened end 32, into the interior 34, and is mounted within the mounting member 30. The inlet portion 17 of the fuel pump 14 extends from the bottom of the mounting member 30.

With reference to FIG. 1, clip structure, generally indicated at 34, couples the mounting member 30 to the flange 26. In the embodiment as shown in FIGS. 3 and 4, the clip structure 34 includes a male coupling structure on the flange 26 and mating, female coupling structure on the mounting member 30. In the embodiment and as best shown in FIG. 3, the male coupling structure includes a plurality of legs 36 extending in a cantilevered manner from the underside of the lip 28 of the flange 26. Each leg 36 includes a tab 38 at an end thereof. With reference to FIG. 4, the female coupling structure includes a plurality of openings 40 in a cantilevered wall 41 of the mounting member 30, spaced so as to receive a tab 38 in an associated opening 40. Each wall 41 has a surface 42 that defines a top of each opening 38. Since the walls 41 are cantilevered, they can flex outwardly to insert the tabs 38 into the openings 40. When bias is removed from the walls 41 they move inwardly so that the tab 38 engages the surface 42 of the associated opening thus coupling the mounting member 30 to the flange 26. It can be appreciated that the male coupling structure can be provided on the mounting member 30 with the female coupling structure being provided on the flange 26. Since the mounting member 30 is coupled to the flange 26 instead of the pump 14, the pump 14 is decoupled from the flange 26 and noise of the module 10 is reduced.

Figure 5:
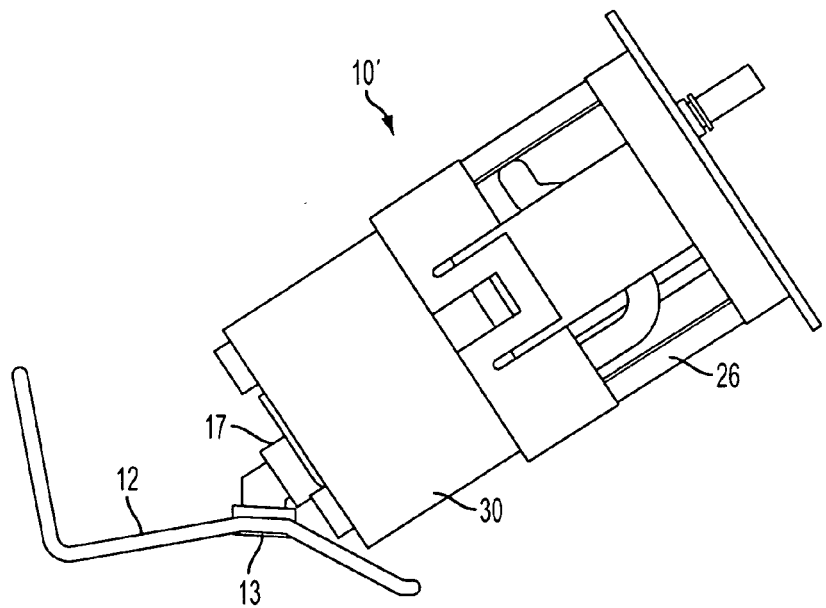
FIG. 5 is a view of another embodiment of a fuel module that can be mounted to a side of a fuel tank.

FIG. 5 shows the module 10' in an arrangement so as to be mounted to a side of a fuel tank.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A fuel delivery module for a fuel tank of a vehicle, the module comprising:
    a flange constructed and arranged to be mounted to an opening in a fuel tank of a vehicle,
    a pump and filter structure comprising:
        a fuel pump constructed and arranged to draw fuel directly from the fuel tank, and
        a fuel filter surrounding at least a portion of the fuel pump for filtering fuel exiting the fuel pump,
    a mounting member to which the pump and filter structure is mounted so that an inlet of the pump is accessible externally of the mounting member,
    clip structure coupling the mounting member to the flange so that the pump is decoupled from the flange, and
    a fuel tank bottom-referencing pump filter coupled to the inlet of the pump and constructed and arranged to filter fuel prior to entering the pump.

2. The module of claim 1, wherein the pump and filter structure further includes a fuel regulator.

3. The module of claim 1, wherein the pump is generally cylindrical with the filter substantially surrounding the fuel pump, and the pump and filter structure includes a housing containing the filter and pump.

4. The module of claim 1, wherein the clip structure includes male coupling structure on one of the flange or the mounting member and mating, female coupling structure on the other of the flange or mounting member.

5. The module of claim 4, wherein the male coupling structure is on the flange and the female coupling structure is on the mounting member.

6. The module of claim 5, wherein the male coupling structure includes a plurality of legs extending from an underside of the flange, with each leg including a tab at an end thereof and wherein the female coupling structure includes a plurality of cantilevered walls defining openings in the mounting member, spaced so as to receive a tab in an associated opening.

7. The module of claim 6, wherein a surface defines a top of each opening with each tab engaging an associated surface.

8. The module of claim 6, wherein the flange includes a lip constructed and arranged to be mounted to a fuel tank, the legs extending from an underside of the lip.

9. The module of claim 1, wherein the flange is a plastic flange.

10. A fuel delivery module for a fuel tank of a vehicle, the module comprising:
    a flange constructed and arranged to be mounted to an opening in a fuel tank of a vehicle,
    a pump and filter structure comprising:
        a fuel pump constructed and arranged to draw fuel directly from the fuel tank, and
        a fuel filter surrounding at least a portion of the fuel pump for filtering fuel exiting the fuel pump,
    a mounting member to which the pump and filter structure is mounted so that an inlet of the pump is accessible externally of the mounting member, and
    means for coupling the mounting member to the flange so that the pump is decoupled from the flange, and
    a fuel tank bottom-referencing pump filter coupled to the inlet of the pump and constructed and arranged to filter fuel prior to entering the pump.

11. The module of claim 10, wherein the pump and filter structure further includes a fuel regulator.

12. The module of claim 10, wherein the pump is generally cylindrical with the filter substantially surrounding the fuel pump, and the pump and filter structure includes a housing containing the filter and pump.

13. The module of claim 10, wherein the means for coupling includes male coupling structure on one of the flange or the mounting member and mating, female coupling structure on the other of the flange or mounting member.

14. The module of claim 13, wherein the male coupling structure is on the flange and the female coupling structure is on the mounting member.

15. The module of claim 14, wherein the male coupling structure includes a plurality of legs extending from an underside of the flange, with each leg including a tab at an end thereof and wherein the female coupling structure includes a plurality of cantilevered walls defining openings in the mounting member, spaced so as to receive a tab in an associated opening.

16. The module of claim 15, wherein a surface defines a top of each opening with each tab engaging an associated surface.

17. The module of claim 15, wherein the flange includes a lip constructed and arranged to be mounted to a fuel tank, the legs extending from an underside of the lip.

18. The module of claim 10, wherein the flange is a plastic flange.

19. A method of decoupling a fuel pump from a flange of a fuel delivery module, the method including:
    providing a flange constructed and arranged to be mounted to an opening in a fuel tank of a vehicle,
    providing pump and filter structure comprising:

a fuel pump constructed and arranged to draw fuel directly from the fuel tank, and a fuel filter surrounding at least a portion of the fuel pump for filtering fuel exiting the fuel pump, mounting the pump and filter structure to a mounting member such that an inlet of the fuel pump is accessible externally of the mounting member, and mounting the mounting member to the flange via a clip structure so that the pump is decoupled from the flange, and providing a fuel tank bottom-referencing pump filter to filter fuel prior to entering the pump.

20. The method of claim 19, wherein the step of mounting the mounting member includes providing the clip structure to include male coupling structure on the flange and mating, female coupling structure on the mounting member, wherein the male coupling structure includes a plurality of legs extending from an underside of the flange, with each leg including a tab at an end thereof and wherein the female coupling structure includes a plurality of cantilevered walls defining openings in the mounting member, spaced so as to receive a tab in an associated opening.

* * * * *